US008830790B2

(12) United States Patent
Bishop et al.

(10) Patent No.: US 8,830,790 B2
(45) Date of Patent: Sep. 9, 2014

(54) APPARATUS AND METHOD FOR COLLECTING GEOPHYSICAL INFORMATION

(75) Inventors: Allen J. Bishop, Richmond, TX (US); Leon Lovheim, Bergen (NO); Magne Oldervoll, Bergen (NO); Samuel K. Ingram, Katy, TX (US); Stephen Tom D. Gray, Isdalstoe (NO)

(73) Assignee: Octio Geophysical AS, Bergen (NO)

( * ) Notice: Subject to any disclaimer, the term of this patent is extended or adjusted under 35 U.S.C. 154(b) by 798 days.

(21) Appl. No.: 12/122,233

(22) Filed: May 16, 2008

(65) Prior Publication Data

US 2008/0285379 A1    Nov. 20, 2008

Related U.S. Application Data

(60) Provisional application No. 60/938,472, filed on May 17, 2007.

(51) Int. Cl.
G01V 11/00  (2006.01)
G01V 1/38  (2006.01)
G01V 1/20  (2006.01)
G01V 1/22  (2006.01)

(52) U.S. Cl.
CPC  *G01V 1/201* (2013.01); *G01V 1/22* (2013.01); *G01V 1/38* (2013.01); *G01V 11/002* (2013.01)
USPC .............................................. 367/76; 367/20

(58) Field of Classification Search
USPC ................. 367/15–20, 76, 78, 79; 340/854.9
See application file for complete search history.

(56) References Cited

U.S. PATENT DOCUMENTS

| 4,092,629 | A  | * | 5/1978 | Siems et al. ..................... 367/79 |
| 4,479,183 | A  | * | 10/1984 | Ergas ............................... 702/17 |
| 5,200,930 | A  | * | 4/1993 | Rouquette ........................ 367/76 |
| 5,627,798 | A  |   | 5/1997 | Siems et al. |
| 6,043,628 | A  | * | 3/2000 | Perelle et al. .................. 320/119 |
| 6,337,578 | B2 | * | 1/2002 | Jefferson et al. ................ 326/38 |
| 6,614,724 | B2 | * | 9/2003 | Behrens et al. ............... 367/154 |
| 6,671,222 | B2 | * | 12/2003 | Wilson et al. ................... 367/13 |
| 6,772,219 | B1 | * | 8/2004 | Shobatake .................... 709/238 |
| 6,992,951 | B2 |   | 1/2006 | O'Brien et al. |
| 7,443,788 | B2 | * | 10/2008 | Cashman et al. ............. 370/222 |
| 7,483,335 | B2 | * | 1/2009 | Oldervoll et al. ............... 367/15 |
| 2003/0214953 | A1 | * | 11/2003 | El-Demerdash et al. ..... 370/400 |
| 2006/0239117 | A1 | * | 10/2006 | Singh et al. ..................... 367/20 |
| 2008/0100140 | A1 | * | 5/2008 | Sorenson et al. ............... 307/40 |
| 2008/0310298 | A1 | * | 12/2008 | Drange ......................... 370/217 |
| 2009/0042513 | A1 | * | 2/2009 | Woosnam ....................... 455/68 |

* cited by examiner

*Primary Examiner* — Ian J Lobo
(74) *Attorney, Agent, or Firm* — Wong, Cabello, Lutsch, Rutherford & Brucculeri, L.L.P.

(57) ABSTRACT

An apparatus for collecting geophysical information may include a geophysical information station disposed along a seismic communication cable. A bypass circuit responsive to a command signal is in communication with a switching circuit that is operable to route electrical power, commands, data or a combination to bypass the geophysical information station in response to the command signal. An exemplary method for bypassing a geophysical information station in a geophysical information collection system includes sending a command signal to a bypass circuit and activating one or more switching circuits using the bypass circuit to route electrical power, commands, data or a combination to bypass the geophysical information station in response to the command signal.

20 Claims, 12 Drawing Sheets

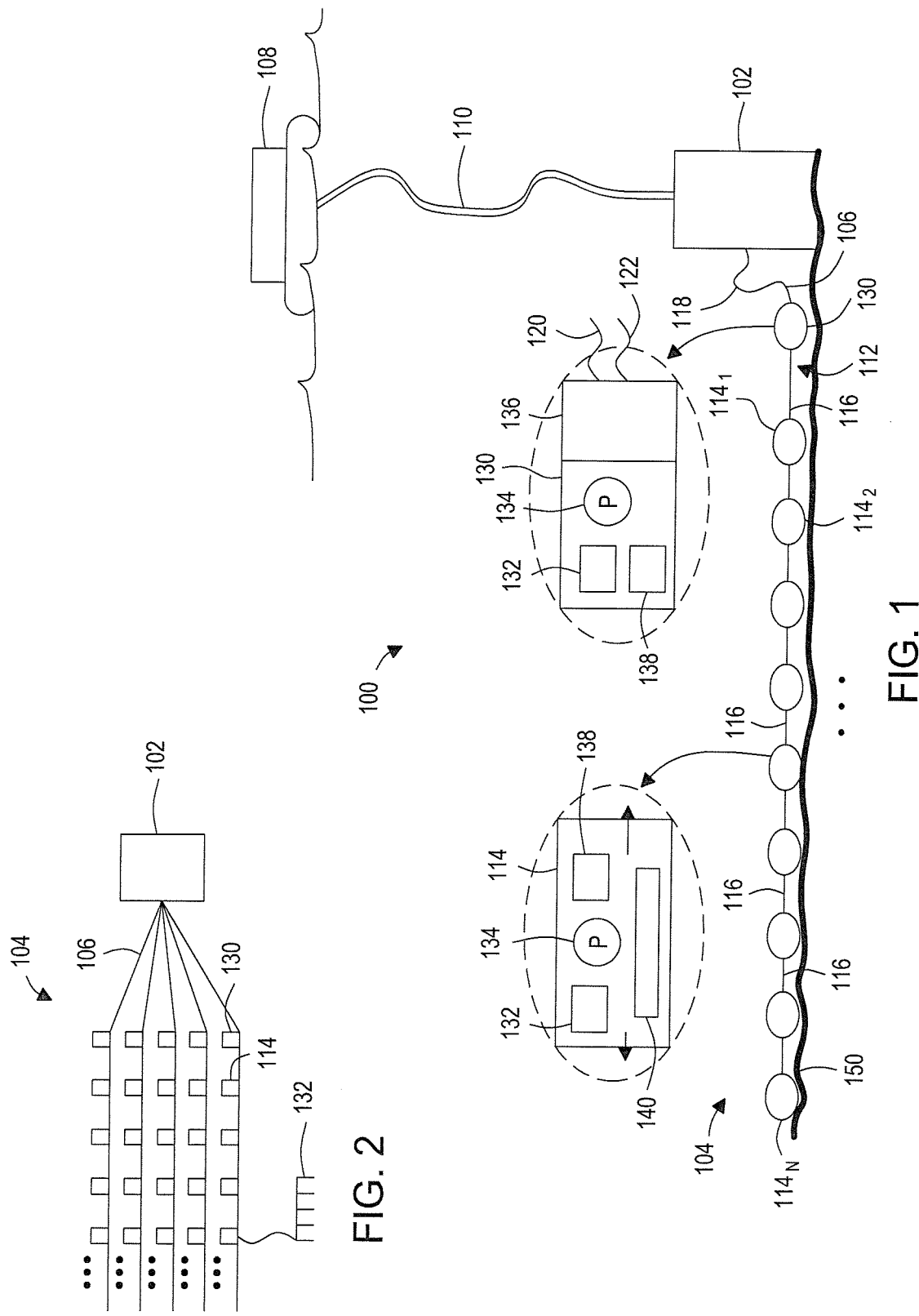

APPARATUS AND METHOD FOR COLLECTING GEOPHYSICAL INFORMATION

CROSS-REFERENCE TO RELATED APPLICATIONS

The present application is a non-provisional application of U.S. provisional application Ser. No. 60/938,472 titled Ocean Bottom Seismic System with Bypass Control filed on May 17, 2007, which application is incorporated herein by reference.

BACKGROUND

1. Technical Field

The present disclosure generally relates to seismic prospecting and in particular to methods and apparatus for controlling seismic information system control.

2. Background Information

In the oil and gas exploration industry, geophysical tools and techniques are commonly employed in order to identify a subterranean structure having potential hydrocarbon deposits and/or to monitor known subterranean reservoirs. Many of these techniques and tools utilize energy in the form of seismic waves to determine subterranean properties, and techniques utilizing seismic waves are often commonly referred to as seismic exploration. Seismic exploration is used in many cases to generate images of subsurface structures by recording energy in the form of vibrations after the energy has been imparted into the earth and has reflected or refracted from geologic formations.

In seismic exploration, seismic waves travel through the ground and reflect off rocks in the subsurface. Boundaries between different rocks often reflect seismic waves, and information relating to these waves is collected and processed to generate a representation or "pictures" of the subsurface. Any number of exploration systems may be used to gather the desired information for processing. Dynamite explosions, vibrator trucks, air guns or the like may be used to create the seismic waves, and sensors such as velocity geophones, accelerometers and/or hydrophones may be laid out in lines, or towed in the case of hydrophones, for measuring how long it takes the waves to leave the seismic source, reflect off a rock boundary, and return to the sensors used.

Seismic systems may be land deployed, marine towed systems or may be installed on the bed at the bottom of a body of water. Although not necessarily relegated to ocean or sea bodies, marine systems disposed under water are often called sea bottom or ocean bottom systems ("OBS").

SUMMARY

The following presents a general summary of several aspects of the disclosure in order to provide a basic understanding of at least some aspects of the disclosure. This summary is not an extensive overview of the disclosure. It is not intended to identify key or critical elements of the disclosure or to delineate the scope of the claims. The following summary merely presents some concepts of the disclosure in a general form as a prelude to the more detailed description that follows.

Disclosed is an apparatus for collecting geophysical information that may include a geophysical information station disposed along a seismic communication cable. A bypass circuit responsive to a command signal is in communication with a switching circuit that is operable to route electrical power, commands, data or a combination to bypass the geophysical information station in response to the command signal.

An exemplary method for bypassing a geophysical information station in a geophysical information collection system includes sending a command signal to a bypass circuit and activating one or more switching circuits using the bypass circuit to route electrical power, commands, data or a combination to bypass the geophysical information station in response to the command signal.

BRIEF DESCRIPTION OF THE DRAWINGS

For a detailed understanding of the present disclosure, reference should be made to the following detailed description of the several non-limiting embodiments, taken in conjunction with the accompanying drawings, in which like elements have been given like numerals and wherein:

FIGS. 1 and 2 illustrate a non-limiting example of a geophysical information system according to several embodiments of the disclosure;

DESCRIPTION OF EXEMPLARY EMBODIMENTS

Figure 3:
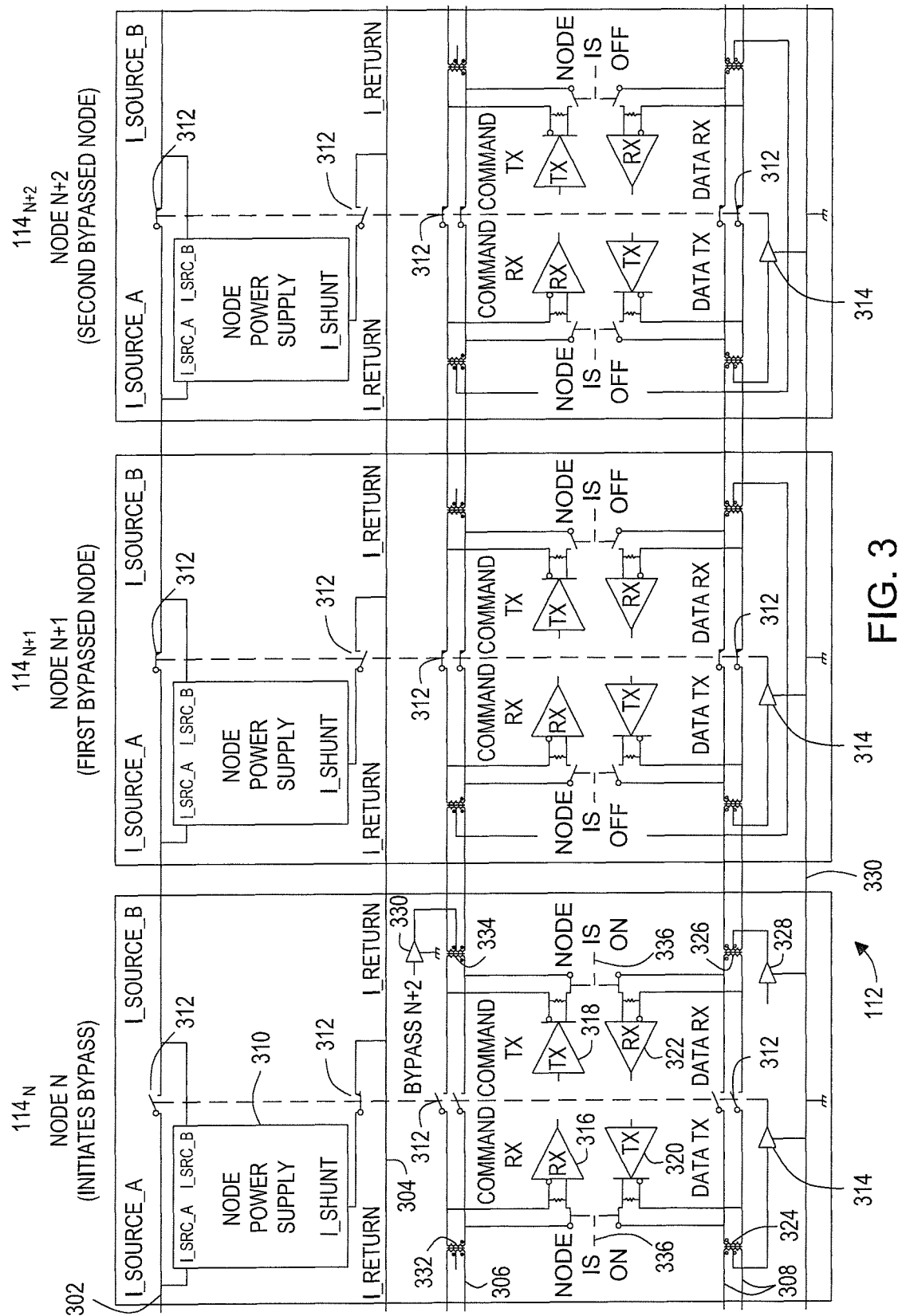
FIG. 3 is a non-limiting example of a seismic communication cable portion having several geophysical information stations.

The present disclosure will use terms, the meaning of which terms will aid in providing an understanding of the discussion herein.

Geophysical information as used herein means information relating to the location, shape, extent, depth, content, type, properties of and/or number of geologic bodies. Geophysical information includes, but is not necessarily limited to marine and land seismic information. Geophysical information may be used for many purposes. In some cases, geophysical information such as seismic information may be used to generate an image of subterranean structures. Imaging, as used herein includes any representation of a subsurface structure including, but not limited to, graphical representations, mathematical or numerical representation, strip charts or any other process output representative of the subsurface structure. For purposes of this disclosure, a geophysical information system may include, but is not limited to, any component, device or aggregate of components or devices operable to generate, acquire, process, transmit, receive, retrieve, originate, or utilize any form of geophysical information. For example, a geophysical information system may be a land acquisition system or a marine acquisition system.

Seismic information as used herein includes, but is not limited to, one or more or any combination of the following, analog signals, digital signals, recorded data, data structures, database information, parameters relating to surface geology, source type, source location, receiver location, receiver type, time of source activation, source duration, source frequency, energy amplitude, energy phase, energy frequency, wave acceleration, wave velocity and/or wave direction.

The term marine as used herein includes any wet environment including fresh water, salt water, transition zones, rivers, lakes, oceans and any surface covered or otherwise in contact with water. Marine, when used to modify an apparatus term or location of any method element, includes floating, towed, platform-based, vessel, on water, below the surface of a wet environment and the like. Towed seismic arrays, ocean bottom systems, hydrophones and the like are non-limiting examples of marine systems. Land systems as used herein include the apparatus and method elements disposed or used in a land environment that is not within the scope of a marine environment.

FIGS. 1 and 2 show a non-limiting examples of a geophysical information system 100 disposed for use at a seabed 150 for acquiring geophysical information relating to subterranean formations under the seabed. The non-limiting example system in FIG. 2 is a top view showing one possible array configuration, which may be an OBS, land system or a towed array. In one example, the system 100 includes a central controller or hub 102 in communication with a seismic acquisition array 104. In the non-limiting example shown, the controller 102 and array 104 communicate via an array lead-in cable 106. The controller may be disposed on the seabed as shown or may be at a surface location. When the controller is on the seabed, the controller may be coupled to a surface buoy or platform 108 via a vertical cable 110.

The example array 104 includes an ocean bottom cable 112. The ocean bottom cable may be on the seabed 150 or may be disposed in a trench. The ocean bottom cable 112 may include a head end communication device 130 coupling the ocean bottom cable 112 to the controller 102 via the array lead-in cable 106. The example ocean bottom cable 112 shown may further include several water-tight nodes or stations $114_1$ through $114_N$. A water-tight coupling cable 116 may be used to couple each pair the several nodes $114_1$ through $114_N$ to form the continuous ocean bottom cable 112. The ocean bottom cable 112 may include any number of sensors for gathering geophysical information. In one example, the ocean bottom cable includes several particle motion sensors 132 such as velocity sensors and/or accelerometers. In one example the ocean bottom cable 112 includes pressure sensors 134 such as hydrophones. In one embodiment, the ocean bottom cable 112 includes multi-component accelerometers and hydrophones.

The lead in cable 106 may include any number of communication conductors 118. In one example the lead in cable conductors 118 include metal conductors 120 such as copper or copper alloy wires. In another example, the cable 106 includes optical fibers 122. In yet another example, the lead in cable 106 includes a combination of metal conductors 120 and optical fibers 122.

The lead in cable may couple the controller 102 directly to the head end communication device 130. The head end communication device 130 may further include any number of devices and circuits useful in the operation of the ocean bottom cable 112. In one example the head end communication device includes a media converter 136 that may be used convert signals of one type to another type. For example, the media converter may convert optical signals on the optical fibers 122 to electrical signals for wire transmission or convert electrical signals to light signals for transmitting on the optical fibers 122. The head end communication device may, but not necessarily, include the same sensors 132, 134 as may be included in each of the stations 114. The stations 114 and the head end communication device may further include one or more processors or microcontrollers 138 to process information such as commands and geophysical information. In several non-limiting examples to be described in more detail later, each station 114 further includes bypass circuits 140 that allow any given station $114_N$ to send power, data and commands around a failed station $114_{N+1}$ toward the tail end of the ocean bottom cable 112 or around a failed station $114_{N-1}$ toward the head end of the ocean bottom cable 112. The terms head end and tail end provide a relative direction and does not limit the scope of the disclosure to any particular direction of information flow. As will become evident with the following discussion and several figures disclosed, the flow of power, data, commands and other information according to the disclosure is bi-directional.

Other sensors may be used for gathering additional geophysical information useful in conducting a seismic survey using the ocean bottom system 100 disclosed. Non-limiting examples of sensors that may be used include microphones, pressure sensors, temperature sensors, magnetometers, global position systems, timing devices or any combination of sensors useful in obtaining geophysical information.

In one non-limiting example, gathered seismic information includes any one or combination of P-wave information, S-wave information, pressure information, temperature, timing information, shot information, location information and orientation information.

GENERAL EXAMPLE

FIG. 3 shows a non-limiting block diagram example of an ocean bottom cable 112 having several stations including local bypass capability. Bypass as used herein means routing information telemetry and power around or through a cable station such that the overall cable function remains operational. Bypassing system stations is advantageous where, as in permanent ocean bottom systems (OBS) the cable array is not intended for retrieval and redeployment. Even with systems designed for redeployment, station failures causing system function loss is costly in terms of lost survey time. The disclosure provides several examples of local bypass where the OBS includes circuits that detect and bypass inoperative stations in order to maintain OBS functionality. In one or more embodiments to be described in more detail below, an initial bypass state is specified by the application of an initial bypass power configuration to the bypass control channel. The bypass state may then be modified by manipulating the bypass power configuration according to a pre-determined set of rules.

FIG. 3 shows a first station $114_N$ coupled to a second station $114_{N+1}$, which is coupled to a third station $114_{N+2}$. In some cases herein, the term Node may be used. The terms station and Node are synonymous as used herein to include any seismic information acquisition system element that receives and/or conveys geophysical information along the seismic information acquisition system or receives and/or conveys geophysical information external to or from the seismic information acquisition system. Each of these stations may be configured with additional circuits and sensors as described above and shown in FIG. 1. For simplicity, the stations are shown with power, command and data telemetry circuits. Other electrical components, such as sensors micro controllers, memory devices may be included in or coupled to the stations as described above and shown in FIGS. 1 and 2 without departing from the scope of the disclosure. Likewise, and with the benefit of the present disclosure, mechanical aspects, such as environmental potting material, water proofing seals and connectors may be implemented by those of skill in the art without additional illustration or discussion here.

In the example shown, one station $114_N$ is configured to receive and to transmit information, while the next two stations $114_{N+1}$, $114_{N+2}$ are configured in bypass operation to simply pass all power and information through to the next (not shown) cable device. Bypass operation as used herein means that a bypassed component or station passes information to the next station without substantially affecting or utilizing the information passed. The present disclosure and figures describes and illustrate bi-directional communication. Therefore, any direction stated for particular information flow is purely for illustration and not by way of limiting the disclosure.

Continuing with FIG. 3, the first station $114_N$ receives electrical power via a source conductor 302 with an associated return conductor 304. The node receives and transmits command information or signals via a pair command signal conductors 306. In the non-limiting example shown the station electronics are isolated using isolation transformers 332, 334. Other information is conveyed using a pair of data conductors 308. Additional isolation transformers 324, 326 may be used to further isolate station electronics. Power, commands and data are passed from station to station during normal operation. Problems arising in the second station $114_{N+1}$, for example, may degrade the overall function of the ocean bottom cable. The figure illustrates power, command and data bypass for the second station $114_{N+1}$ and for the third station $114_{N+2}$.

The first station $114_N$ includes a power supply 310 connected to controllable switches 312 that may be configured autonomously or by command to propagate bypass commands that may configure the other stations for bypass operation. In one example, the switches 312 are operated using a signal generated at an enabling circuit 314 coupled to one of the data conductor isolation transformers 324. The non-limiting example as shown is a common mode configuration with the circuit 314 input coupled to a center tap of the isolation transformer 324. Other examples providing bypass will also be addressed later. Electrical power according to the present disclosure may be considered bi-directional. As shown, a common ground 330 is provided among the stations. Each station case may be used as a chassis or common ground that is electrically coupled to other stations using a ground conductor in the interconnecting cable as described above and shown in FIG. 1.

The station $114_N$ further includes a command receiving circuit 316 and a command transmitting circuit 318 that provide by-directional communication for geophysical information used for commands transmitted over the command conductors 306. The command Geophysical information in the form of data may be conveyed via a data receiver circuit 320 and a data transmitter circuit 322, which provide bi-directional data communication over the data conductors 308. Controllable switches 336 may be used to activate and deactivate respective command and data receivers and transmitters. In one example, the switches are controlled using a micro controller or other processing device. In one example, the switch command may come from the hub controller 102 described above and shown in FIG. 1. In another example, the processing device may be one or more micro controllers 138 or other processors housed in the ocean bottom cable. The micro-controller(s) 138 may be housed within the station $114_N$ or elsewhere in the ocean bottom cable or both.

Figure 10:
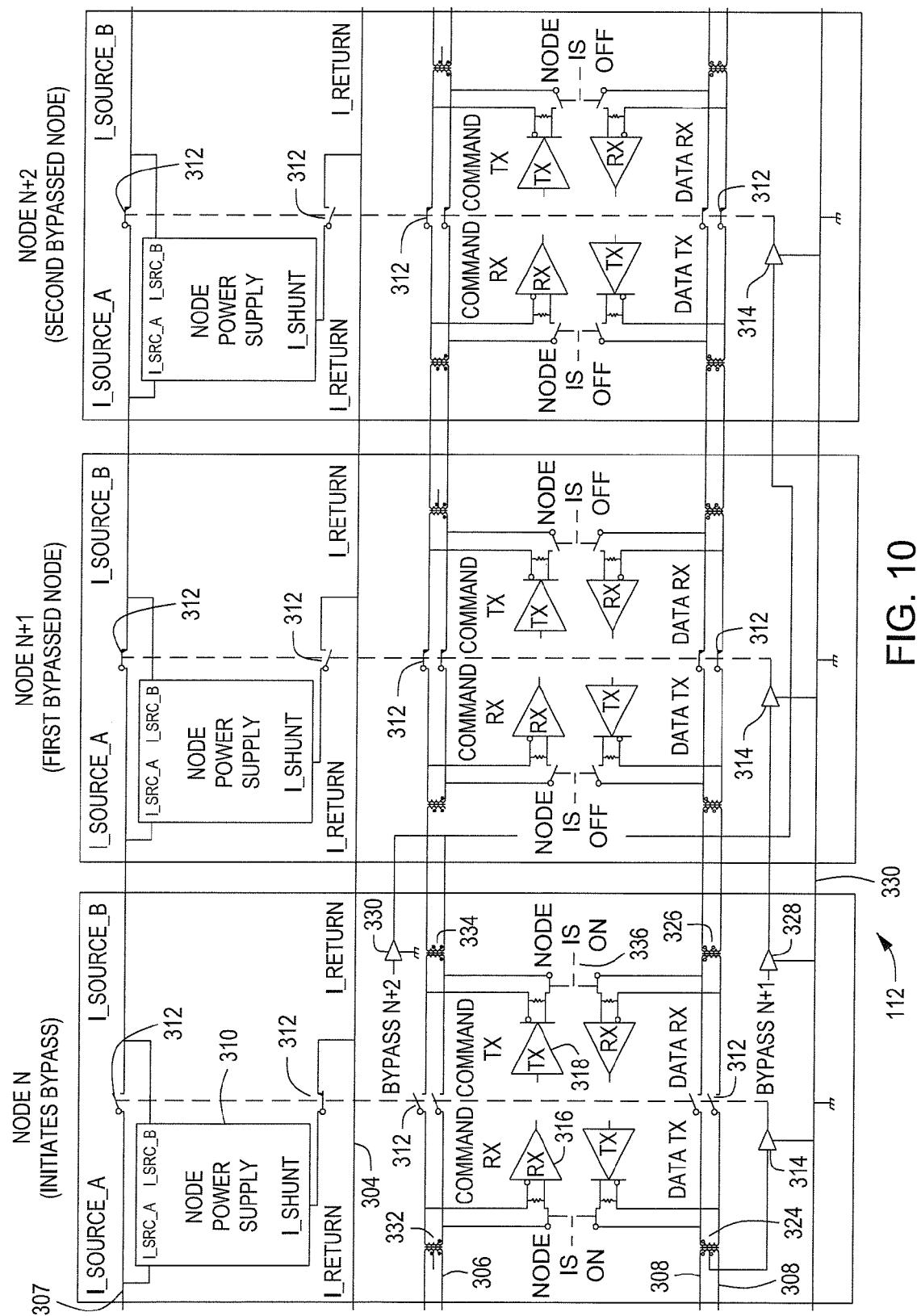
FIG. 10 illustrates a non-limiting example of a seismic communication cable portion having several geophysical information stations having bypass capability.

The example of FIG. 3, as mentioned earlier, is a double bypass example. The station $114_N$ that may be used to bypass other nodes $114_{N+1}$, $114_{N+2}$ includes an N+1 bypass circuit 328 coupled to one of the data conductor isolation transformers 326. The N+1 bypass circuit 328 when enabled propagates a signal for bypassing one of the down stream stations $114_{N+1}$. For double station bypass a second N+2 bypass circuit 330 may be coupled to one of the command conductor isolation transformers 334. The second N+2 bypass circuit 330 when enabled propagates a signal for bypassing a second down stream station $114_{N+2}$. The non-limiting example of FIG. 3 shows the isolation transformers 326, 328 coupled to the respective bypass circuits 328, 330 in common mode configurations with the respective circuit input coupled to a center tap of the associated isolation transformer 326, 328. FIG. 10 shows another example with alternate wiring. The non-limiting example of FIG. 10 is substantially identical to the example of FIG. 3, except that the N+1 and N+2 bypass circuits 330, 328 are not coupled to the center tap of the respective command and data isolation transformers 334, 326. Likewise, the enabling circuits 314 receive bypass commands directly from the respective bypass circuits 330, 338.

The example of FIG. 3, as mentioned earlier, is a double bypass example. The station $114_N$ that may be used to bypass other nodes $114_{N+1}$, $114_{N+2}$ includes an N+1 bypass circuit 328 coupled to one of the data conductor isolation transformers 326. The N+1 bypass circuit 328 when enabled propagates a signal for bypassing one of the down stream stations $114_{N+1}$. For double station bypass a second N+2 bypass circuit 330 may be coupled to one of the command conductor isolation transformers 334. The second N+2 bypass circuit 330 when enabled propagates a signal for bypassing a second down stream station $114_{N+2}$. The non-limiting example of FIG. 3 shows the isolation transformers 326, 334 coupled to the respective bypass circuits 328, 330 in common mode configurations with the respective circuit input coupled to a center tap of the associated isolation transformer 326, 334. FIG. 10 shows another example with alternate wiring. The non-limiting example of FIG. 10 is substantially identical to the example of FIG. 3, except that the N+1 and N+2 bypass circuits 330, 328 are not coupled to the center tap of the respective command and data isolation transformers 334, 326. Likewise, the enabling circuits 314 receive bypass commands directly from the respective bypass circuits 330, 328.

FIG. 3 is provided for general discussion of the present disclosure. Although bypass circuits are not shown in the downstream stations $114_{N+1}$, $114_{N+2}$, such circuitry may be added without departing from the scope of the disclosure. Each station 114, therefore, may be substantially the same as any other station $114_N$.

In operation, an active station or node (Node N) may be commanded to bypass a first successive downstream station or node (Node N+1) under predetermined conditions such as a failure in the N+1 station. The ocean bottom cable 112, when initially activated using the hub 102, will sequentially transmit power to each station 114 along the particular cable 112 of the array 104. The power distribution provides a rapid wake-up of the entire cable before the need to activate geophysical information acquisition circuits in each individual station. When a particular station $114_N$ successfully powers up, then that station becomes an "active station" and may bypass a next station or stations that fail the initial power up by using the several non-limiting example circuits described herein.

The same active station may be commanded to bypass successive downstream stations, e.g. Node N+2, for a double station bypass. The bypass process may be controlled at the active station Node N by a power microcontroller 138.

Any number of command signaling may be used for actuating node bypass according to the present disclosure. The non-limiting example of a double bypass configuration may be actuated using binary voltage levels at the input of the bypass circuits 328, 330. In one or more embodiments, the command signals may include parallel multi-level signaling. In one or more embodiments, the command signals may include polarity reversal signaling. In one or more embodiments, the command signals may include cycled polarity signaling. In one or more embodiments, the command signals may include dial-up bypass signaling.

A non-limiting example of parallel multi-level signaling may include one or more discrete voltage levels or current levels supplied from an active node, and received by the next in the chain on one or more of the balanced circuits present in the interconnecting cable. The parallel multi-level signals are interpreted together by a receiving module as signals forming a base-n value where n represents the number of discrete levels of voltage or current on each circuit. The receiving node deactivates the receiving node local power supply and resources, modifies the value of the received base-n value, and propagates the resulting value by the same technique to the one or more succeeding modules.

Polarity-reversal signaling according to one or more non-limiting embodiments includes sensing the presence or absence of power on one of the balanced circuits present in the interconnecting cable to determine if the receiving node should de-activate the receiving node local resources. The current flow direction or voltage polarity of the power on the balanced circuits indicates whether the receiving module should additionally cause de-activation of the next succeeding node.

Cycled polarity signaling for bypass control according to one or more embodiments includes an active node establishing an initial bypass state by applying suitably polarized bypass power to the bypass control channel. To modify that state for bypassing additional nodes, the active node applies a pattern of bypass power polarity reversals once for each additional node to be bypassed. This pattern is based at least in part on the number of polarity reversals, the intervals between the polarity reversals or a combination thereof may be any suitable pattern. In one or more embodiments, the pattern may be chosen to optimize other aspects of system performance.

Dial-up bypass signaling in one or more embodiments includes an active node establishing single-node bypass configuration by applying bypass power to the bypass control channel. To bypass additional nodes in series, the active node applies a series of low-going pulses such as a brief removal of power to the bypass channel. The pattern of pulses used may be any suitable pattern to increment the bypass level. In one example, a single pulse may be used for each additional bypass level. The pulse width of each pulse low pulse is sufficiently short to avoid a power off state in the bypass circuitry in the downstream nodes. Thus, the pulses serve to convey logic information in the form of a command signal.

In one or more embodiments, the total bypass power or current being consumed by the several nodes may be measured using known techniques to determine whether the desired number of bypassed nodes has been accomplished.

Station bypass circuitry may include a bypass power supply referenced to case ground for supplying electrical power to several switches and solid-state relays at Node N and to the bypassed node(s). OBS cables may deal with power supply voltages hundreds of volts referenced to case ground. In these systems isolator transformers may used to pass signals from the Node N power microcontroller the bypass circuit. As described will be described in further detail below above and shown in FIGS. 4 through 9 and FIGS. 11-12, field-effect transistors (FET) or metal-oxide-semiconductor field-effect transistor (MOSFET) switches may be used at the active station Node N to activate and route bypass signals. Solid-state (low capacitance and low resistance) relays may be used in the downstream nodes to perform telemetry bypass. The downstream relays may be powered by the bypass signals generated at the active station Node N. Photovoltaic driven MOSFET switches may be used at the bypassed station nodes to perform power bypass. The Photovoltaic driven MOSFET switches may be powered by the bypass signals generated at the active Node N.

In several examples, the bypass signals are transmitted in phantom through telemetry transmission pairs such as the command and data telemetry pairs 206, 108 described above and shown in FIG. 1. In the example shown, bypass signals for station N+1 is transmitted on the Data conductor pair, and the bypass signal for station N+2 is transmitted from the active station Node N on the command pair conductors 106. The N+2 signal is transmitted to the N+2 station via the data conductor pair. The bypass signal return path in the examples shown is through case ground 330.

Figure 4:
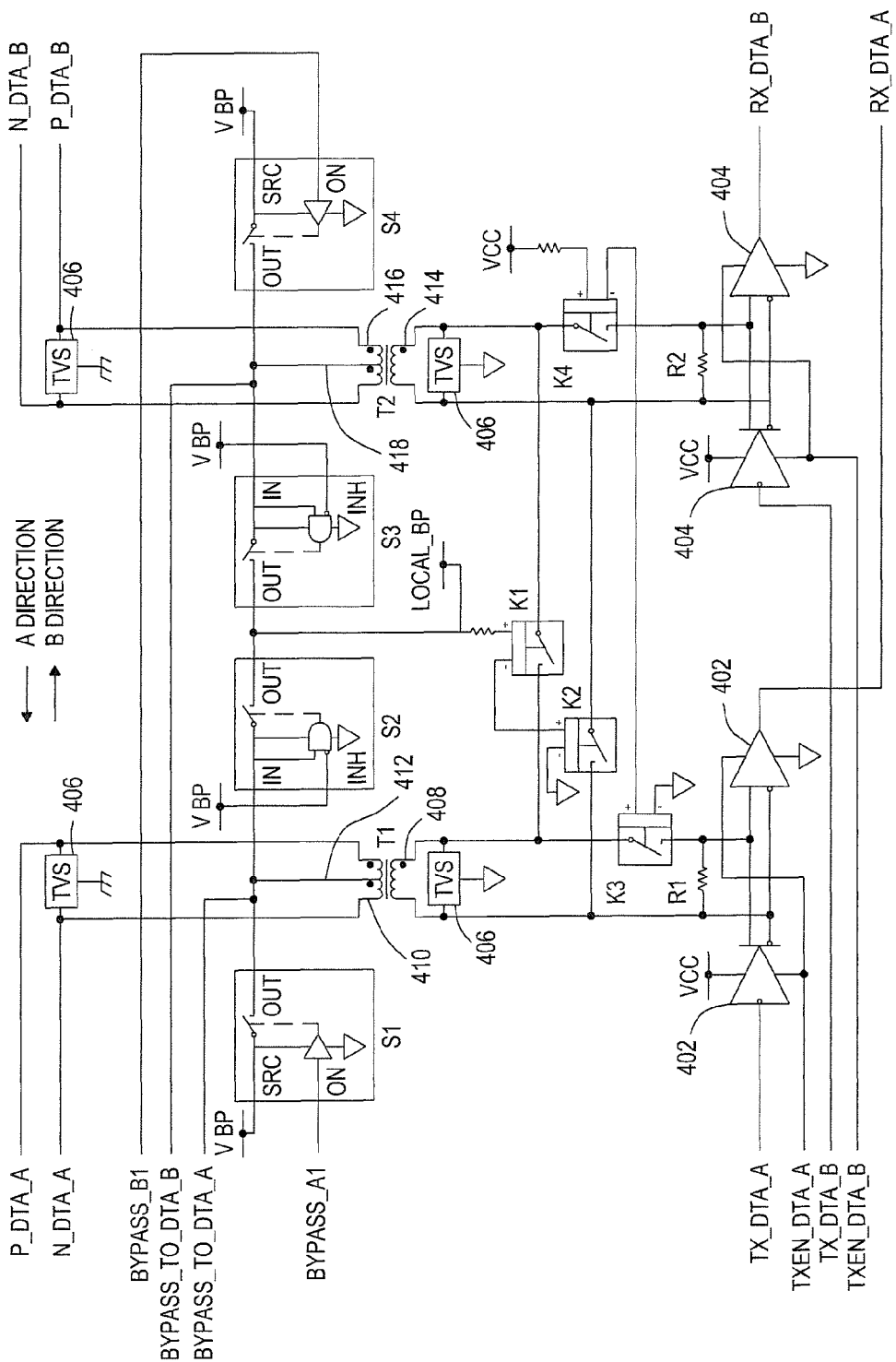
FIGS. 4-6 illustrate respective non-limiting data telemetry, command telemetry and power circuits arranged for double station bypass.

FIG. 4 schematically represents a non-limiting example of data telemetry circuits that may be used in the several station examples disclosed herein for double bypass operations. Table 1 below provides the various input and output signals represented in the double bypass data telemetry schematic of FIG. 4.

TABLE 1

| | |
|---|---|
| P_DTA_A/N_DTA_A | Bi-directional Telemetry Channel A |
| BYPASS_B1 | Microcontroller signal to initiate bypass of Node N + 1 |
| BYPASS_TO_DTA_B | Path that conveys BYPASS_B2 from Node N to Node N + 2 (Double Bypass B-direction) through Node N + 1 |
| BYPASS_TO_DTA_A | Path that conveys BYPASS_A2 from Node N to Node N − 2 (Double Bypass A-direction) through Node N − 1 |
| BYPASS_A1 | Microcontroller signal to initiate bypass of Node N − 1 |
| TX_DTA_A | Processor output used to send data in the A direction |
| TXEN_DTA_A | Processor output used to enable the A direction transceiver |
| TX_DTA_B | Processor output used to send data in the B direction |
| TXEN_DTA_B | Processor output used to enable the B direction transceiver |
| P_DTA_B/N_DTA_B | Bi-directional Telemetry Channel B |
| RX_DTA_B | Processor input used to receive data from the B direction |
| RX_DTA_A | Processor input used to receive data from the B direction |

Continuing now with the schematic of FIG. 4, the Node data telemetry channel includes an A-direction transceiver 402 and a B-direction transceiver 404. The A-direction transceiver 402 is connected to termination resistor R1, photovoltaic devices K1, K2 and K3 and to an optional transient voltage suppressor 406. The A-direction transceiver 402 is further connected to one port 408 of isolation transformer T1. A second port 410 of isolation transformer T1 connected to another optional transient voltage suppressor 406 and to the P_DTA_A and N_DTA_A conductor pair.

The second port 410 of transformer T1 also has a center tap connection 412 that is connected to switches S1 and S2 and to other not shown circuits. The center tap 412 will be described in further detail later.

The B-direction transceiver 404 is connected to termination resistor R2, photovoltaic devices K4, K1, and K2 and to an optional transient voltage suppressor 406. The B-direction transceiver 404 is further connected to one port 414 of isolation transformer T2. A second port 416 of isolation transformer T2 connected to another optional transient voltage suppressor 406 and to the P_DTA_B and N_DTA_B conductor pair.

The second port 416 of transformer T2 also has a center tap connection 418 that is connected to switches S1 and S2 and to other not shown circuits. The center tap 418 will be described in further detail later.

Figure 5:
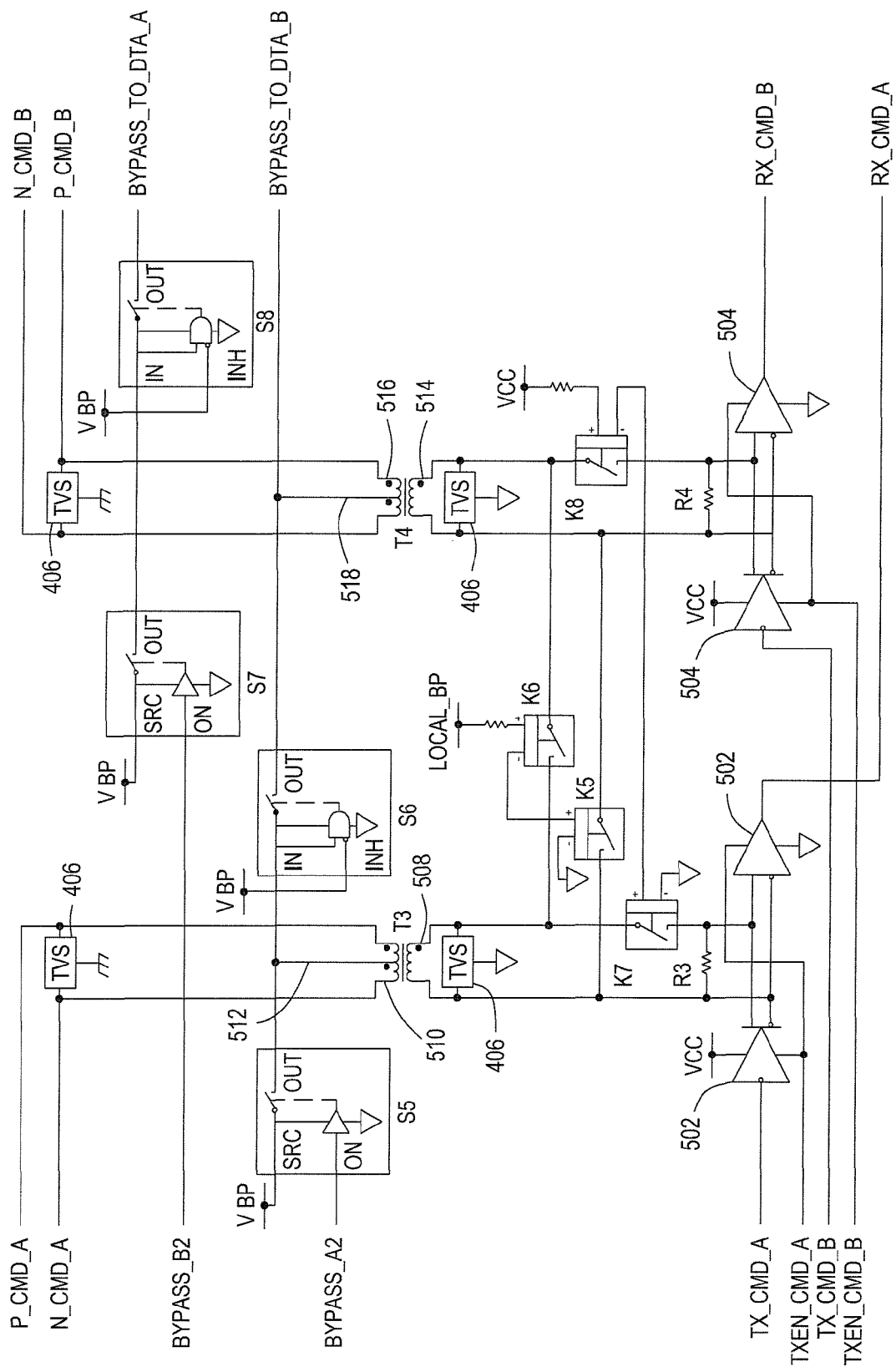

FIG. 5 schematically represents a non-limiting example of command telemetry circuits that may be used in the several station examples disclosed herein for double bypass operations. Table 2 below provides the various input and output signals represented in the double bypass command telemetry schematic FIG. 5.

TABLE 2

| | |
|---|---|
| P_CMD_A/ N_CMD_A | Bi-directional Command Channel A |
| BYPASS_B2 | Microcontroller signal to initiate bypass of Node N + 2 |
| BYPASS_TO_DTA_B | Path that conveys BYPASS_B2 from Node N to Node N + 2 (Double Bypass B-direction) through Node N + 1 |
| BYPASS_TO_DTA_A | Path that conveys BYPASS_A2 from Node N to Node N − 2 (Double Bypass A-direction) through Node N − 1 |
| BYPASS_A2 | Microcontroller signal to initiate bypass of Node N − 2 |
| TX_CMD_A | Processor output used to send command in the A direction |
| TXEN_CMD_A | Processor output used to enable the A direction command transmitter |
| TX_CMD_B | Processor output used to send command in the B direction |
| TXEN_CMD_B | Processor output used to enable the B direction command transmitter |
| P_CMD_B/ N_CMD_B | Bi-directional Command Channel B |
| RX_CMD_B | Processor input used to receive command from the B direction |
| RX_CMD_A | Processor input used to receive data from the B direction |

Continuing now with the command telemetry schematic of FIG. 5, the Node command telemetry channel includes an A-direction transceiver 502 and a B-direction transceiver 504. The A-direction transceiver 502 is connected to termination resistor R3, photovoltaic devices K6, K5 and K7 and to an optional transient voltage suppressor 406. The A-direction transceiver 502 is further connected to one port 508 of isolation transformer T3. A second port 510 of isolation transformer T3 may be connected to another optional transient voltage suppressor 406 and to the P_CMD_A and N_CMD_A conductor pair.

The second port 510 of transformer T3 also has a center tap connection 512 that is connected to switches S5 and S6 and to other not shown circuits. The center tap 512 will be described in further detail later.

The B-direction command transceiver 504 is connected to termination resistor R4, photovoltaic devices K8, K6, and K5 and to an optional transient voltage suppressor 406. The B-direction transceiver 504 is further connected to one port 514 of isolation transformer T4. A second port 516 of isolation transformer T4 may be connected to another optional transient voltage suppressor 406 and to the P_CMD_B and N_CMD_B conductor pair.

The second port 516 of transformer T4 also has a center tap connection 518 that is connected to switches S7 and S8 and to other not shown circuits. The center tap 518 will be described in further detail later.

Figure 6:
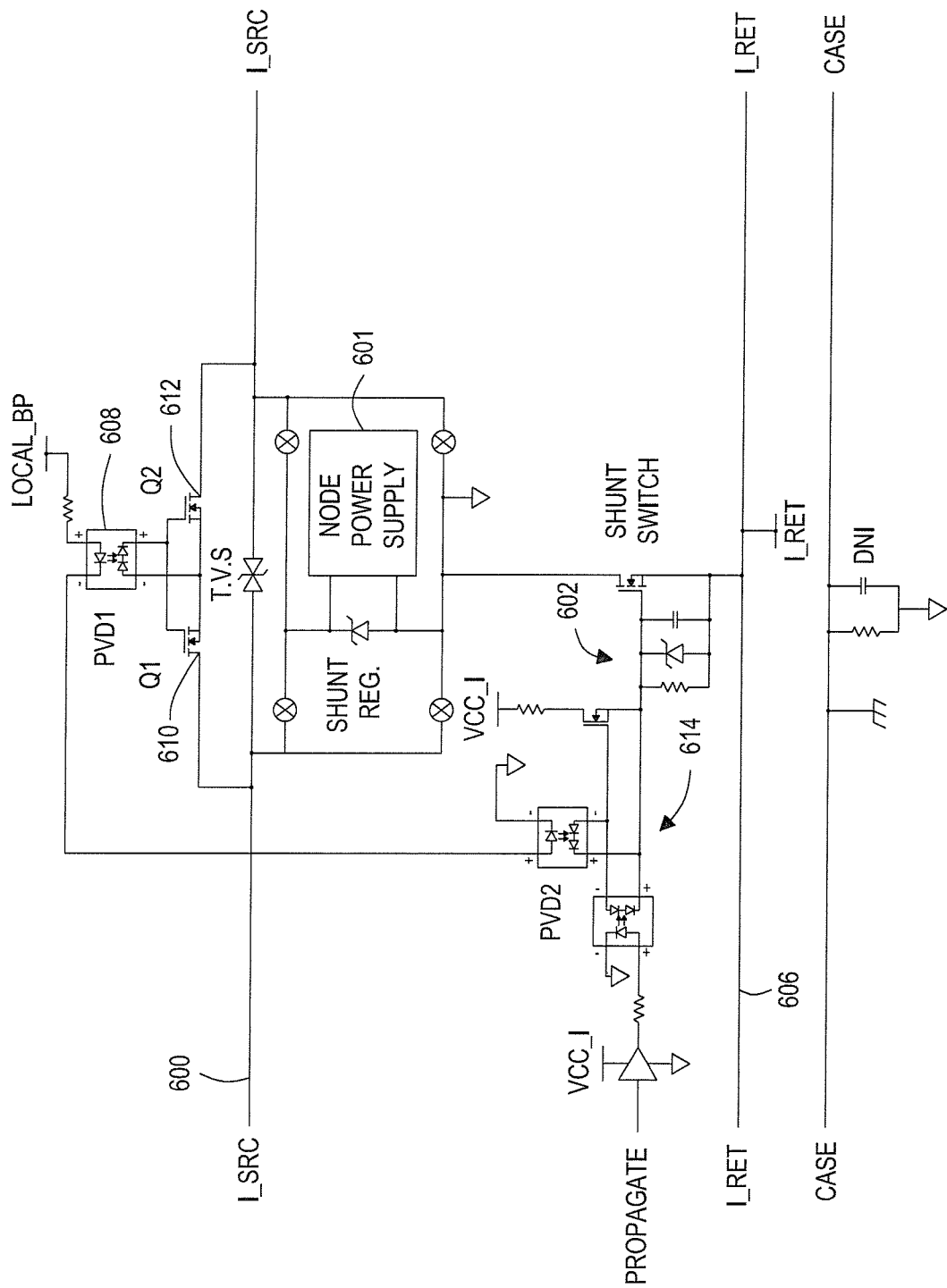

FIG. 6 schematically represents a non-limiting example of power propagation circuits that may be used in the several station examples disclosed herein for double bypass operations. Table 3 below provides the various input and output signals represented in the double bypass power schematic FIG. 6.

TABLE 3

| | |
|---|---|
| I_SRC_B/I_SRC_A | Source current signal |
| PROPAGATE | Microcontroller signal used to power up the next non-bypassed Node in the Ocean Bottom Cable |
| I_RET | Return current signal |
| CASE | Case Ground Plane |

Referring to FIGS. 3 and 6, the station $114_N$ receives power in the form of constant current from either I_SRC_A or I_SRC_B, depending on directionality on an I_SRC conductor 600. When a station is not the last powered station in the ocean bottom cable, the station returns current to the other I_SRC_A or I_SRC_B signal, e.g., I_SRC_B is the return when I_SRC_A is power, on an I_RET conductor 606. When the node is the last powered node in the cable it returns current directly to I_RET 606 using the shunt circuit 602.

Photovoltaic device PVD1 shown at 608 is connected to MOSFETs Q1 and Q2 610, 612. Together, Q1 and Q2, when on ("activated") close to conduct to bypass power around the node power supply 601. The power supply 601 is connected to the shunt switch circuit 602 that returns current to I_RET 606 when the Node is the last active node in the cable.

Photovoltaic device PVD2 614, when active ("on"), forces the shunt switch circuit 602 into an open state thereby preventing current from flowing through node power supply 601 during bypass operation.

Double Bypass Operation

Having generally described the several circuits shown in FIGS. 4 through 6, the following discussion will address examples of power, command and data telemetry in for a non-limiting double bypass configuration.

An active station node may be configured to bypass downstream inactive nodes. When power is applied to the active station Node (Node N), a supply voltage (VCC) may be used to activate solid-state relays K3, K4, K7 and K8. Activating the relays K3, K4, K7 and K8 connects transmission line terminating resistors R1, R2, R3 and R4 to the transceiver side of the telemetry transformers T1, T2, T3 and T4. Connected in this manner, inactive nodes may be bypassed without having the bypassed station termination resistors connected. Bypass power V_BP is connected to the INHIBIT inputs of switches S2 S3, S6 and S8. The bypass signal is generated when any of S1, S4, S5 or S7 is activated. Inhibiting operation of switches S2, S3, S6 and S8 helps ensure proper routing of the bypass signal and helps avoid Node N bypassing itself.

Assume Node N is bypassing Node N+1 and Node N+2. These nodes would be coupled on the right side ("B" Side) of the schematic. The power microcontroller may be used to assert BYPASS_B1, which activates switch S4. The center-tap of the Data telemetry transformer T2 is thus switched to V_BP. The signal V_BP providing the bypass signal for Node N+1. The bypass signal V_BP is transmitted as a rider signal or phantom on the Data pair downstream to Node N+1. Note that switch S3 in Node N, being inhibited, does not pass the bypass signal V_BP to LOCAL_BP in the example shown. The inhibited switch S3 avoids the Node N bypassing itself.

The power microcontroller may also assert BYPASS_B2 which activates switch S7. The center-tap of the Command telemetry transformer T4 is thus switched to V_BP to provide a bypass signal for Node N+2. The N+2 bypass signal V_BP is transmitted as a rider signal or phantom on the Command pair downstream to Node N+1. In the example here, switch S8 is inhibited and does not pass the V_BP signal to LOCAL_BP at Node N. The inhibited switch S8 avoids the Node N bypassing itself.

Now, if we view the schematics as representing Node N+1, the bypass signal V_BP for Node N+1 from Node N appears at Node N+1 on the center-tap of the A side Data telemetry transformer, T1. Switch S1 is off, but switch S2 passes the signal to LOCAL_BP. LOCAL_BP powers solid-state relays K1 and K2 to connect transformers T1 and T2. When Node N+1 is in bypass operation, it is not powered. In Node N+1 bypass operation, relays K3, K4, K7 and K8 are open and the transformers are not connected to the terminating resistors. With transformers T1 and T2 connected, Data telemetry is bypassed to Node N+2. LOCAL_BP also powers solid-state relays K5 and K6 connecting transformers T3 and T4. With these transformers connected, Command telemetry is bypassed to Node N+2. LOCAL_BP may further be used to power photovoltaic drivers PVD1 and PVD2. PVD1 activates, e.g. "turns on" the N channel MOSFETs that bypasses I_SRC to Node N+2. PVD2 is connected to a depletion mode MOSFET such that when PVD2 is powered the MOSFET is turned off bypassing I_RET to Node N+2.

Still viewing the schematic from the Node N+1 point of view, the bypass signal for Node N+2 from Node N appears at Node N+1 on the center-tap of the A side Command telemetry transformer, T3. Switch S5 is off, but switch S6 passes the signal to BYPASS_TO DTA_B. BYPASS_TO DTA_B is connected to the center-tap of the B side Data telemetry transformer, T2. Thus the bypass signal for Node N+2 is transmitted as a rider signal or phantom on the Data pair from Node N+1 to Node N+2.

Viewing the schematics from the Node N+2 viewpoint, the Node N+2 may be setup for bypass of telemetry and power substantially as is Node N+1 discussed above. Therefore, additional discussion is not necessary here.

Power may be propagated from Node N through (i.e. bypassing) Node N+1 and through (i.e. bypassing) Node N+2 to a third downstream station Node N+3.

Various aspects of the disclosure may be changed without departing from the scope of the disclosure. Any useful electronic relays may be used for relays K3, K4, K7 and K8. In one example the relays may include low capacitance and low resistance N channel MOSFETs powered by a charge pump voltage doubler.

Power usage for the double bypass examples varies depending on the bypass configuration used. In one example, relays K3, K4, K7 and K8 may be removed and double bypass operation may be accomplished using about 12 photovoltaic devices. An estimate of the power usage including power supply efficiency is roughly 50 mW<Ptotal<200 mW. Configuring the OBC for single bypass operation may reduce the power requirement as much as one half of that for double bypass configurations.

Figure 7:
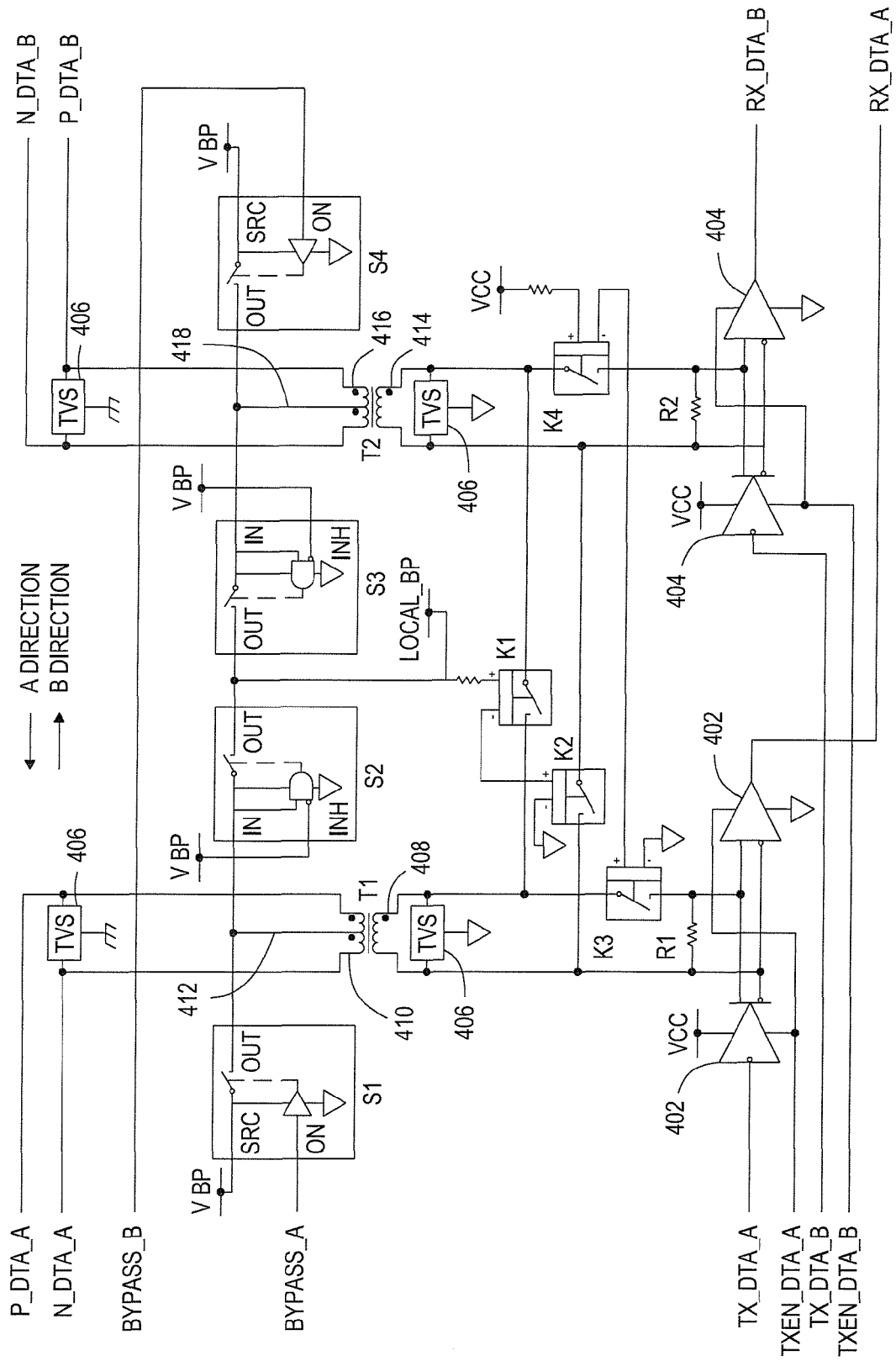
FIGS. 7-9 illustrate respective non-limiting data telemetry, command telemetry and power circuits arranged for single station bypass.
Figure 8:
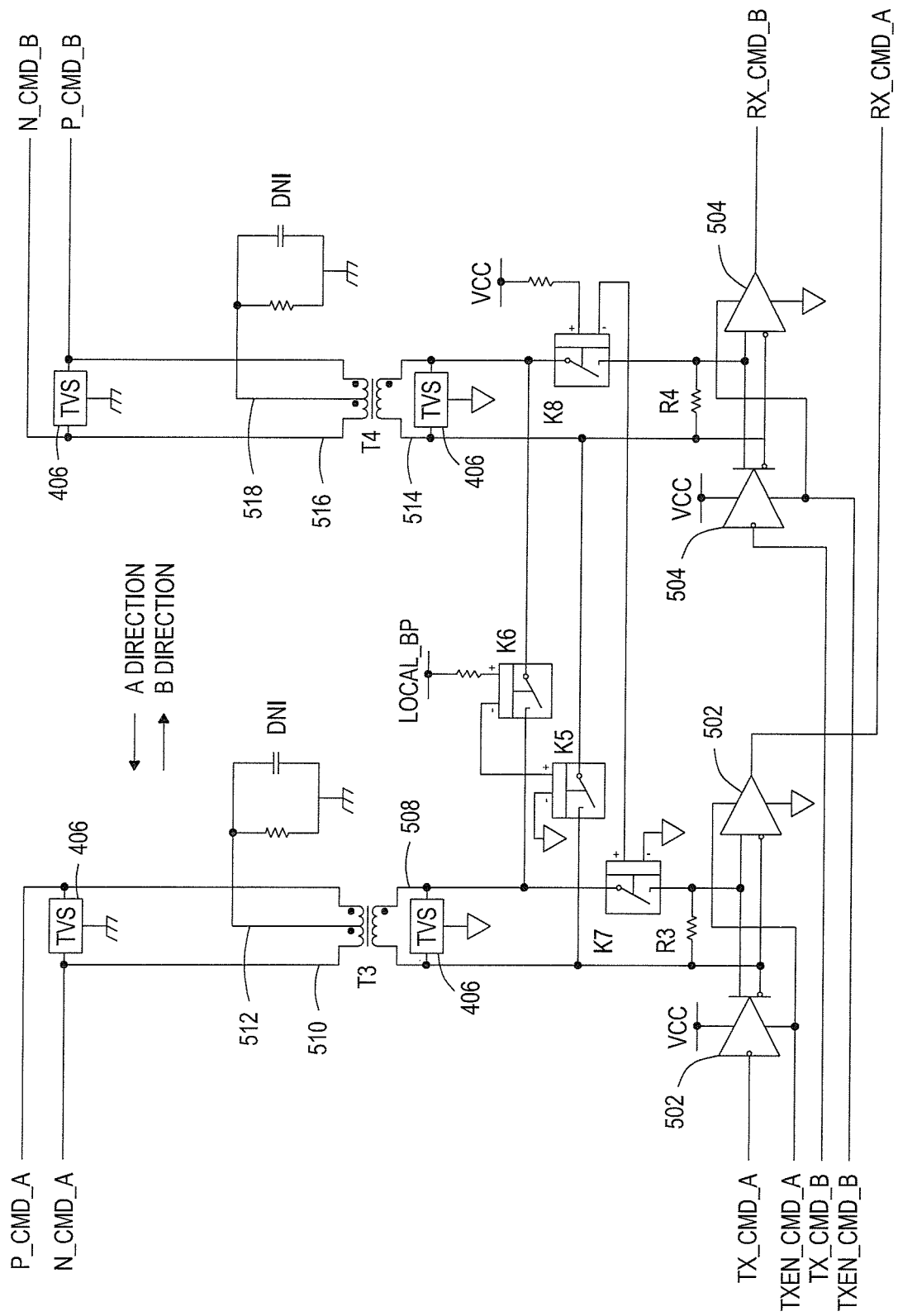
Figure 9:
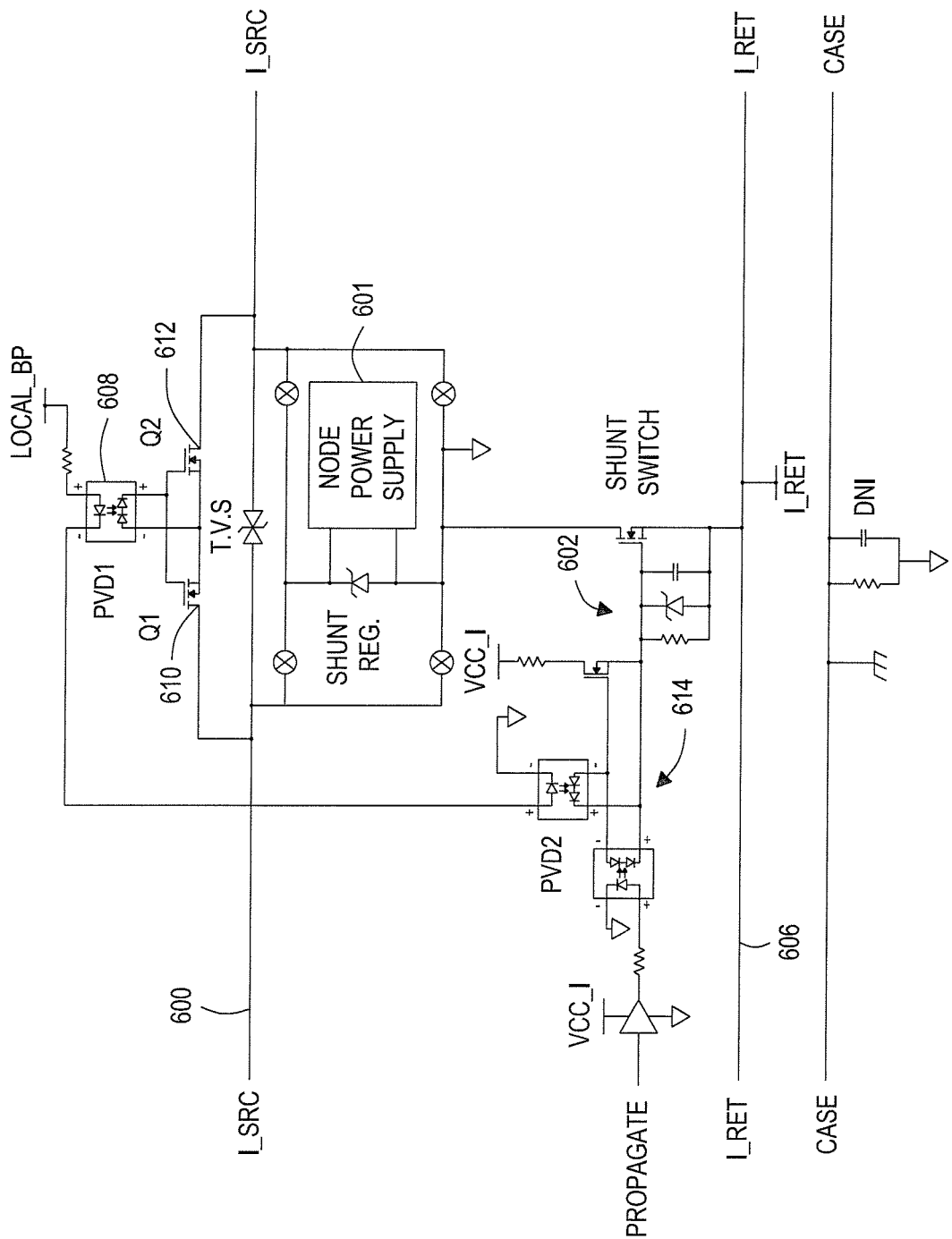

FIGS. 7-9 illustrate non-limiting examples of data, command and power bypass circuits. The components shown are substantially similar to the respective components of FIGS. 4 through 6, so like reference numerals will be used where appropriate.

FIG. 7 schematically represents a non-limiting example of data telemetry circuits that may be used in the several station examples disclosed herein for single bypass operations. Table 4 below provides the various input and output signals represented in the single bypass data telemetry schematic of FIG. 7.

TABLE 4

| | |
|---|---|
| P_DTA_A/N_DTA_A | Bi-directional Telemetry Channel A |
| BYPASS_B | Microcontroller signal to initiate bypass of Node N + 1 |
| BYPASS_A | Microcontroller signal to initiate bypass of Node N − 1 |
| TX_DTA_A | Processor output used to send data in the A direction |
| TXEN_DTA_A | Processor output used to enable the A direction transceiver |
| TX_DTA_B | Processor output used to send data in the B direction |
| TXEN_DTA_B | Processor output used to enable the B direction transceiver |
| P_DTA_B/N_DTA_B | Bi-directional Telemetry Channel B |
| RX_DTA_B | Processor input used to receive data from the B direction |
| RX_DTA_A | Processor input used to receive data from the B direction |

Continuing now with the schematic of FIG. 7, the Node data telemetry channel includes an A-direction transceiver 402 and a B-direction transceiver 404. The A-direction transceiver 402 is connected to termination resistor R1, photovoltaic devices K1, K2 and K3 and to an optional transient voltage suppressor 406. The A-direction transceiver 402 is further connected to one port 408 of isolation transformer T1. A second port 410 of isolation transformer T1 connected to another optional transient voltage suppressor 406 and to the P_DTA_A and N_DTA_A conductor pair.

The second port 410 of transformer T1 also has a center tap connection 412 that is connected to switches S1 and S2 and to other not shown circuits. The center tap 412 will be described in further detail later.

The B-direction transceiver 404 is connected to termination resistor R2, photovoltaic devices K4, K1, and K2 and to an optional transient voltage suppressor 406. The B-direction transceiver 404 is further connected to one port 414 of isolation transformer T2. A second port 416 of isolation transformer T2 connected to another optional transient voltage suppressor 406 and to the P_DTA_B and N_DTA_B conductor pair.

The second port 416 of transformer T2 also has a center tap connection 418 that is connected to switches S1 and S2 and to other not shown circuits. The center tap 418 will be described in further detail later.

FIG. 8 schematically represents a non-limiting example of command telemetry circuits that may be used in the several station examples disclosed herein for single bypass operations. Table 5 below provides the various input and output signals represented in the single bypass command telemetry schematic FIG. 8.

TABLE 5

| | |
|---|---|
| P_CMD_A/ N_CMD_A | Bi-directional Command Channel A |
| TX_CMD_A | Processor output used to send command in the A direction |

TABLE 5-continued

| | |
|---|---|
| TXEN_CMD_A | Processor output used to enable the A direction command transmitter |
| TX_CMD_B | Processor output used to send command in the B direction |
| TXEN_CMD_B | Processor output used to enable the B direction command transmitter |
| P_CMD_B/ N_CMD_B | Bi-directional Command Channel B |
| RX_CMD_B | Processor input used to receive command from the B direction |
| RX_CMD_A | Processor input used to receive data from the B direction |

Continuing now with the command telemetry schematic of FIG. 8, the Node command telemetry channel includes an A-direction transceiver 502 and a B-direction transceiver 504. The A-direction transceiver 502 is connected to termination resistor R3, photovoltaic devices K6, K5 and K7 and to an optional transient voltage suppressor 406. The A-direction transceiver 502 is further connected to one port 508 of isolation transformer T3. A second port 510 of isolation transformer T3 may be connected to another optional transient voltage suppressor 406 and to the P_CMD_A and N_CMD_A conductor pair.

The second port 510 of transformer T3 also has a center tap connection 512 that is connected to an RC circuit DNI.

The B-direction command transceiver 504 is connected to termination resistor R4, photovoltaic devices K8, K6, and K5 and to an optional transient voltage suppressor 406. The B-direction transceiver 504 is further connected to one port 514 of isolation transformer T4. A second port 516 of isolation transformer T4 may be connected to another optional transient voltage suppressor 406 and to the P_CMD_B and N_CMD_B conductor pair.

The second port 516 of transformer T4 also has a center tap connection 518 that is connected to an RC circuit DNI.

FIG. 9 schematically represents a non-limiting example of power propagation circuits that may be used in the several station examples disclosed herein for single bypass operations. Table 6 below provides the various input and output signals represented in the single bypass power schematic FIG. 9.

TABLE 6

| | |
|---|---|
| I_SRC_B/I_SRC_A | Source current signal |
| PROPAGATE | Microcontroller signal used to power up the next non-bypassed Node in the Ocean Bottom Cable |
| I_RET | Return current signal |
| CASE | Case Ground Plane |

The station 114$_N$ receives power in the form of constant current from I_SRC, which may be in either direction. When the station is the last powered node in the cable it returns current directly to I_RET using shunt circuit 602.

Photovoltaic device PVD1 is connected to MOSFETs Q1 and Q2. Together, Q1 and Q2, when on ("activated") close to conduct to bypass power around the node power supply 601. The power supply 601 is connected to the shunt switch circuit 602 that returns current to I_RET when the Node is the last active node in the cable.

Photovoltaic device PVD2, when active ("on"), forces the shunt switch circuit 602 into an open state thereby preventing current from flowing through node power supply 601 during bypass operation.

FIGS. 7 through 9 schematically represent station Node circuits configured for single bypass operation. Assume Node N is to bypass Node N+1 on the "B" side (to the right on the schematic). The power microcontroller will assert BYPASS_B 1 which activates switch S4. The center-tap of the B side Data telemetry transformer T2 is thus switched to V_BP. V_BP is the bypass signal for Node N+1. The bypass signal V_BP is transmitted as a rider signal or phantom on the Data pair downstream to Node N+1. In the example here, switch S3 in Node N is inhibited and does not pass the bypass signal to LOCAL_BP. Therefore Node N will not bypass itself.

Viewing the schematics from the viewpoint of the bypassed Node N+1, the bypass signal for Node N+1 from Node N appears at Node N+1 on the center-tap of the A side Data telemetry transformer, T1. Switch S1 is off, but switch S2 passes the bypass signal to LOCAL_BP. LOCAL_BP powers solid-state relays K1 and K2 which connects transformers T1 and T2. Because Node Ns-1 is not powered, relays K3, K4, K7 and K8 are open and the transformers are not connected to the terminating resistors. With transformers T1 and T2 connected, Data telemetry is bypassed to Node N+2. LOCAL_BP also powers solid-state relays K5 and K6 connecting transformers T3 and T4. With transformers T3 and T4 connected, Command telemetry is bypassed to Node N+2. Finally, LOCAL_BP powers photovoltaic drivers PVD1 and PVD2. PVD1 to activate, i.e. "turn on" the N channel MOSFETs that bypass I_SRC to Node N+2. PVD2 is connected to the depletion mode MOSFET such that when PVD2 is powered the MOSFET is turned off bypassing I_RET to Node N+2.

After all of the above is accomplished, power is propagated from Node N through (bypassing) Node N+1 to Node N+2.

Figure 11:
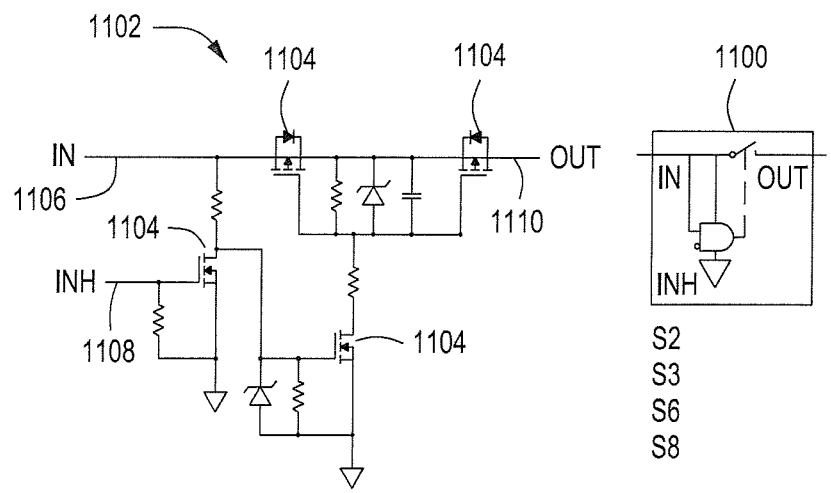
FIGS. 11 and 12 illustrate examples of switch configurations that may be used in several embodiments described herein.
Figure 12:
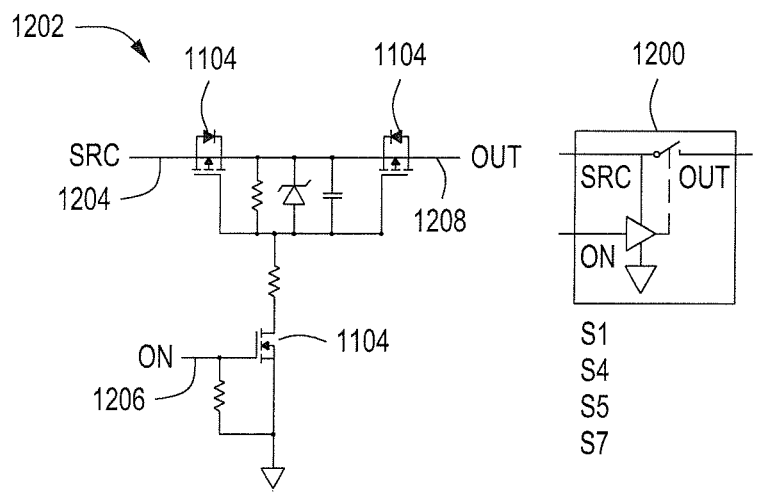

FIGS. 11 and 12 illustrate in more detail non-limiting examples of electronic switches that may be used for respective switches S1, S4, S5 and S7 and for respective switches S2, S3, S6 and S8. Switches S2, S3, S6 and S8 are shown in FIG. 11 as a logic circuit 1100 and as a discrete component circuit 1102 for implementing an electronic switch. The discrete component circuit may utilize MOSFET circuits 1104 to realize the circuit substantially as shown. In this manner, an input lead 1106 may receive a signal and an inhibit lead 1108 may receive a control signal to control the switch output on lead 1110. In FIG. 12, switches S1, S4, S5, and S7 are shown as a logic circuit 1200 and as a discrete component circuit 1202 for implementing an electronic switch. The discrete component circuit may utilize MOSFET circuits 1104 similar to those described above and shown in FIG. 11, but reconfigured to provide a source signal on a source lead 1204 that is enabled by an enabling signal on an ON lead 1206 to control the switch output on lead 1208.

Figure 13:
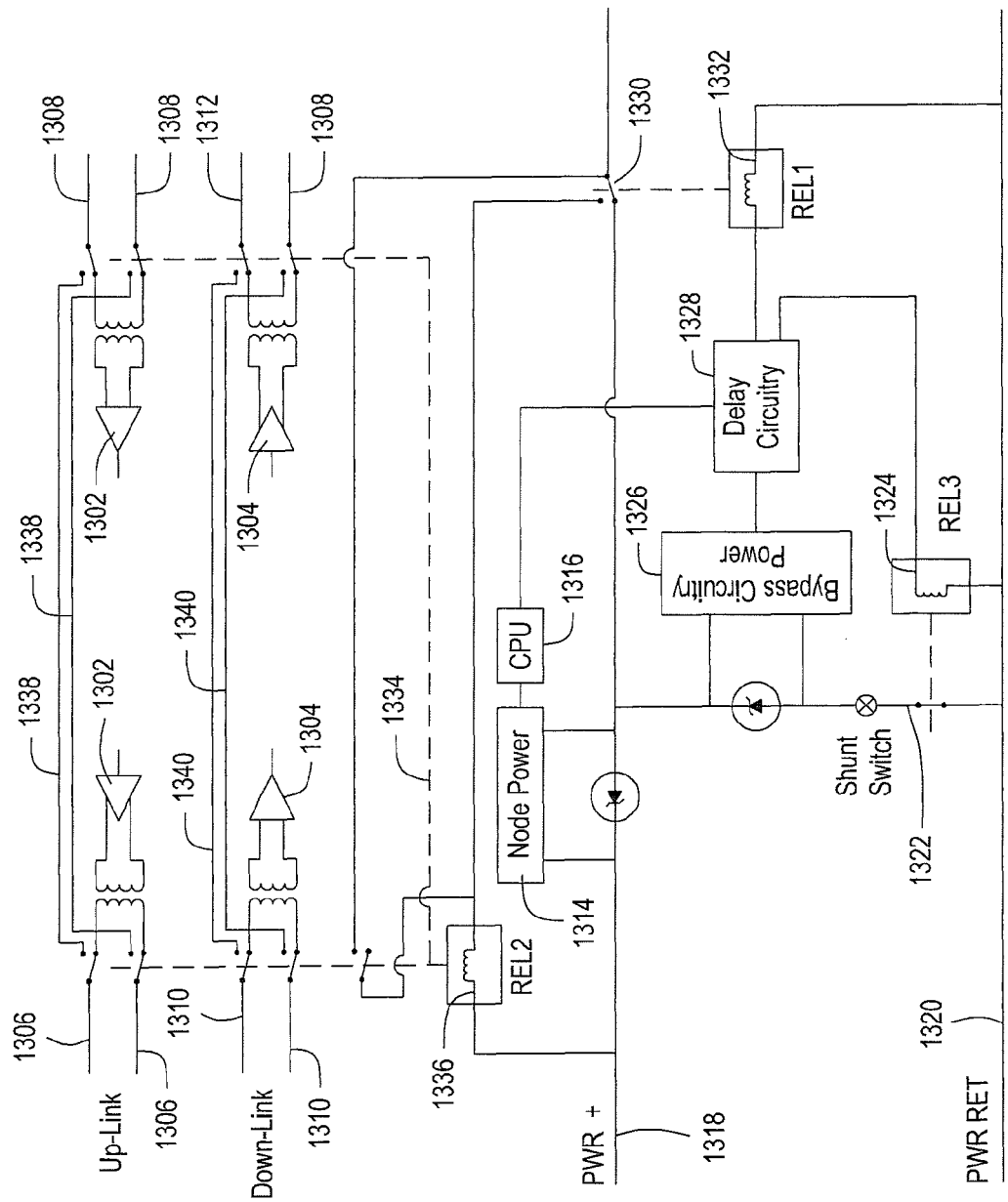
FIGS. 13 and 14 illustrate non-limiting examples of geophysical information stations having self-bypass capability according to several embodiments of the disclosure.
Figure 14:
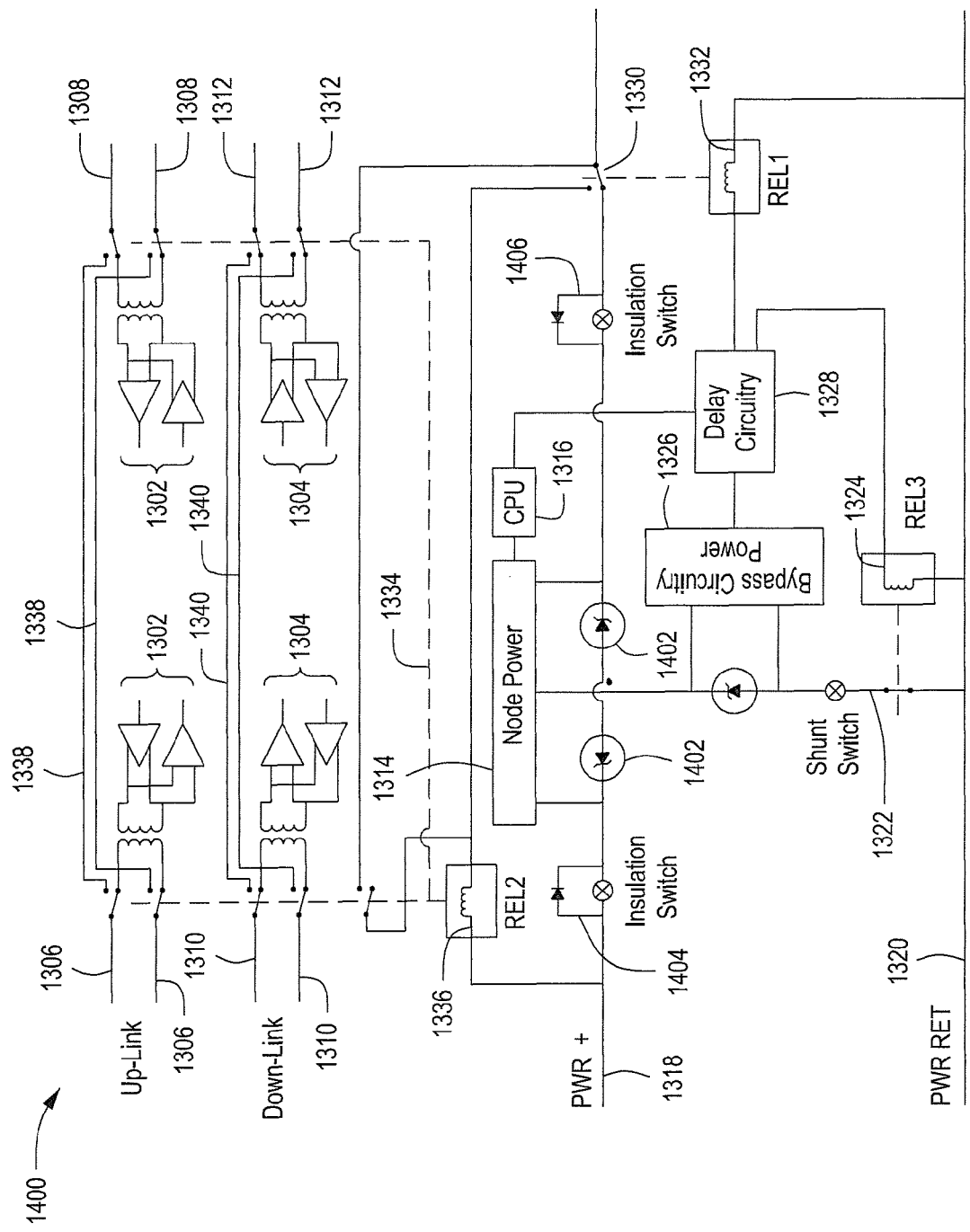

FIGS. 13 and 14 illustrate non-limiting examples of nodes having self bypass circuitry. FIG. 13 is a non-limiting example of a sensor node 1300 that may be one of several substantially similar sensor nodes 1300 disposed along a seismic communication cable. Only one node 1300 is shown for simplicity and many circuits typical of a sensor node and used for standard operation are likewise omitted for simplicity and shown here schematically as isolated uplink circuits 1302 and isolated downlink circuits 1304. The uplink circuits 1302 are coupled to a pair of node uplink input leads 1306 and to a pair of node uplink output leads 1308. The downlink circuits 1304 are similarly coupled to downlink input leads 1310 and to downlink output leads 1312.

The node 1300 in the non-limiting example of FIG. 13 includes a regulated node power supply 1314. The node power supply is coupled to a controller 1316, and the controller may include a processor, memory and other circuits for controlling aspects of the sensor node 1300. The node 1300 includes an input power lead 1318 and a return lead 1320. The input power lead 1318 and the return lead 1320 are connected to a shunt switch 1322. The shunt switch 1322 may be an electronic switch or may be a mechanical switch controlled by a relay 1324 shown here as REL3. Electronic switches using discrete components such as FETs, MOSFETs or the like may be used in addition to or in place of the mechanical switches shown in these non-limiting examples.

The exemplary node 1300 further includes a bypass circuit power supply 1326 connected to a delay circuit 1328, and the delay circuit is connected to the controller 1316. The delay circuit 1328 is connected to the power shunt switch 1322 via the relay REL3 1324 relay. The delay circuit 1328 is connected to power conductor switch 1330, which in this example is a mechanical switch activated by a relay 1332 shown here as REL1. The power conductor switch 1330 need not be mechanical, but may include an electronic switch as mentioned above with respect to the shunt switch 1322.

One lead of the power conductor switch 1330 is connected to a switching circuit 1334, which in this example is a mechanical switch activated by a relay 1336 shown here as REL2. The switching circuit 1334 includes one or more switches that need not be mechanical, but may include one or more electronic switches as mentioned above with respect to the shunt switch 1322. The switching circuit 1334 is operable to switch the uplink input and output leads 1306, 1308 to an alternate uplink conductor pathway 1338. In similar fashion, the switching circuit 1334 is operable to switch the downlink input and output leads 1310, 1312 to an alternate downlink conductor pathway 1340.

FIG. 14 is a non-limiting example of a node 1400 having bi-directional communication and isolation from other nodes and/or cable components as shown schematically with added bi-directional uplink and downlink circuits 1302, 1304. The example here uses many of the same elements described above and shown in FIG. 13, so discussion here is to the added components. In this example, the node power source 1314 includes dual regulators 1402 and the power conductor 1318 is connected to oppositely-polarized isolators 1404, 1406. The power isolators may be any suitable isolators, such as the switches shown here or other isolators.

Each self-bypassing node may contain the bypass circuitry described above and shown in FIGS. 13 and 14. The bypass circuit in each node may be used to bypass the respective node where a failure or other fault is detected in other node electronics such as the uplink and downlink circuits or in the power-up circuitry where the node fails to start in a normal manner. Each bypass circuit may be substantially passive in normal node operation, and normal node operation is not affected by a failure in the bypass circuit. The bypass circuitry shown in these examples may be coupled to a separate printed circuit board or may be housed on the same circuit board or boards as housing the nominal node circuits without departing from the scope of the disclosure.

In normal operation where a node is operating properly, the node operation may begin by current flowing through the closed shunt switch 1322. The initial current will also activate the bypass module by flowing current to the bypass power supply 1326. The bypass power supply then automatically applies power to the delay circuits 1328. Where the node powers up normally, the shunt switch 1322 automatically opens within a selected delay period and before the delay circuit output is activated. Thus, a normally powering node will deactivate the bypass circuit within the selected delay period. In this manner, the power on the power conductor is propagated to the next node, N+1, to continue the power-up sequence.

Where the node fails to power up in a nominal manner, the shunt switch 1322 will remain closed. After the delay period, the delay circuits 1328 will activate REL1 leading to array current flowing to REL2 and to the power return 1320 via the shunt switch 1322 of the next node N+1. The REL 2 contact that is in parallel with the REL1 contact results in REL2 remaining energized as long as there is current running through the array. REL2, when energized will switch the conductor paths to the respective alternate pathways 1338, 1340 thereby bypassing the node by disconnecting the node uplink and downlink circuit paths from the rest of the communication cable. REL3 is then activated to propagate power to the next node in the cable.

Where the node is the last node in the cable and the shunt switch 1322 us not opened, the controller 1316 operates to disable the delay circuit 1328 within the delay period to avoid bypassing the final node. Disabling commands for verifying proper node operation prior to disabling the bypass before disabling the bypass function may be originated at a remote location such as the surface for ocean bottom systems of from within another node controller 1316. The functionality of the bypass module may be tested during the power-up sequence or initialization phase by sending commands from an OBS recording system. These commands may be configured to command the local controller 1316 to leave the delay circuit operational and to shunt the circuit by not activating the shunt switch 1322.

Having described above the several aspects of the disclosure, one skilled in the art will appreciate several particular embodiments useful in determining a property of an earth subsurface structure.

In one particular embodiment, an apparatus for collecting geophysical information is disclosed that includes a watertight cable conveyable to an underwater bed; a first communication station disposed along the cable, the first communication station including a electric switch responsive to a signal transmitted by a second communication station, which switch when activated switching a first communication path within the first communication station to a second communication path, the second communication path being a pass-through communication path.

In another particular embodiment, an apparatus for collecting geophysical information is disclosed that includes a communication cable; a first communication station disposed along the cable, a second communication station disposed along the cable and axially displaced from the first communication station, an electric switch coupled to the first communication station, the electric switch responsive to a signal, which switch when activated switching a first communication path to a second communication path, the second communication path bypassing the second communication station.

What is claimed is:

1. An apparatus for collecting geophysical information comprising:
   a first geophysical information station disposed along a seismic communication cable, said first geophysical information station including:
   a command circuit for receiving command signals from an upstream source and transmitting commands to a downstream source;
   a first bypass circuit responsive to a command signal issued by the command circuit to issue a first bypass signal; and
   a switching circuit in communication with a first bypass circuit of a first upstream geophysical information station to receive a bypass signal and operable to route electrical power, commands, and data to bypass said first geophysical information station in response to a command signal from a command circuit of the first upstream geophysical information station causing the generation of a first bypass signal by the first upstream geophysical information station.

2. An apparatus according to claim 1, wherein said first geophysical information station comprises a marine system.

3. An apparatus according to claim 1, wherein the seismic communication cable includes a permanently deployed ocean-bottom cable.

4. An apparatus according to claim 1, wherein said first geophysical information station comprises a land system.

5. An apparatus according to claim 1, further comprising one or more isolation transformers coupling said first bypass circuit to command conductors, data conductors or a combination thereof.

6. An apparatus according to claim 1, wherein said first geophysical information station further comprises a self bypass circuit responsive to a self bypass command signal issued by said command circuit to issue a self bypass signal and in communication with said switching circuit, wherein said switching circuit is further operable to bypass said first geophysical information station in response to the issued self bypass signal.

7. An apparatus according to claim 1, further comprising a delay circuit in communication with said first bypass circuit.

8. An apparatus according to claim 1, wherein said first bypass circuit is substantially passive during normal geophysical information station operation.

9. An apparatus according to claim 1, further comprising a shunt regulated power supply.

10. An apparatus according to claim 1, wherein said first geophysical information station includes a bypass power supply.

11. An apparatus according to claim 1, wherein said first bypass circuit is adapted to receive the command signal transmitted from a remote controller to activate said first bypass circuit in response to one or more faults including a fail on power-up condition.

12. An apparatus according to claim 1, further comprising a head end communication device.

13. An apparatus according to claim 12, wherein said head end communication device comprises a media converter configured to convert a signal of a first type into a signal of a second type.

14. An apparatus according to claim 12, wherein said head end communication device comprises one or more processors or microcontrollers.

15. An apparatus according to claim 1, wherein said first geophysical information station further includes:

a second bypass circuit responsive to a command signal issued by the command circuit to issue a second bypass signal; and wherein said switching circuit is further in communication with a second bypass circuit of the second upstream geophysical information station to receive a bypass signal and is operable to route electrical power, commands, and data to bypass said first geophysical information station in response to a command signal from a command circuit of the second upstream geophysical information station causing the generation of a second bypass signal by the second upstream geophysical information station.

16. An apparatus according to claim 15, wherein the apparatus further comprises:

a second geophysical information station and a third geophysical information station, each of said second and third geophysical information stations including a command circuit, first and second bypass circuits and a switching circuit as in said first geophysical information station, wherein said second geophysical information station is coupled to said first geophysical information station as the first upstream geophysical information station, wherein said third geophysical information station is coupled to said first geophysical information station as the second upstream geophysical information station and to said second geophysical information station as the first upstream geophysical information station, and wherein said switching circuit of said first geophysical information station is coupled to said second bypass circuit of said third geophysical information station without coupling to said second geophysical information station.

17. An apparatus according to claim 1, wherein said first geophysical information station further comprises one or more processors or microcontrollers.

18. An apparatus according to claim 1, wherein said first geophysical information station further comprises one or more sensors.

19. An apparatus according to claim 18, wherein said one or more sensors comprise at least one of the following: a particle motion sensor, a pressure sensor, a multi-component sensor, a temperature sensor, a magnetometer, a global position system, or a timing device.

20. An apparatus according to claim 1, wherein said command signals comprise at least one of the following: a parallel multi-level signal, a polarity reversal signal, a cycled polarity signal, or a dial-up bypass signal.

* * * * *